United States Patent

Madej

[15] 3,666,100

[45] May 30, 1972

[54] METHOD AND APPARATUS FOR COLLECTING OIL FROM AN UNDERWATER LEAK

[72] Inventor: Thaddeus A. Madej, 1223 Polk St., Hollywood, Fla. 33020

[22] Filed: Apr. 24, 1969

[21] Appl. No.: 818,868

[52] U.S. Cl. ..........................210/83, 210/DIG. 21, 210/242
[51] Int. Cl. .........................................................B01d 21/00
[58] Field of Search......................210/83, 84, 170, 242, 538, 210/539, 540, DIG. 21; 61/1, 69; 285/419

[56] References Cited

UNITED STATES PATENTS

| | | | |
|---|---|---|---|
| 14,273 | 2/1856 | Bartlett | 210/170 X |
| 3,389,559 | 6/1968 | Logan | 210/242 X |
| 3,412,862 | 11/1968 | Chaplin | 210/170 X |
| 3,470,091 | 9/1969 | Budd et al. | 210/170 X |
| 3,339,512 | 9/1967 | Siegel | 210/DIG. 21 |
| 3,475,038 | 10/1969 | Matherne | 285/419 X |
| 3,500,841 | 3/1970 | Logan | 61/69 X |

*Primary Examiner*—Reuben Friedman
*Assistant Examiner*—T. A. Granger
*Attorney*—John H. Oltman

[57] ABSTRACT

A method and apparatus for collecting oil from an underwater leak including the steps of (1) detecting the location of the leak, (2) submerging an inverted collector shell under the water to a position directly over and enclosing the leak so that oil, being lighter than water, rises from the source of the leak into the collector shell and displaces water in the collector shell to partially fill the collector shell with oil, (3) providing a conduit leading from the submerged collector shell upward through the water to a pump and from a pump to a storage receptacle, and (4) pumping oil from the collector shell through the conduit to the storage receptacle with said pump. Also disclosed is apparatus for carrying out the method.

2 Claims, 3 Drawing Figures

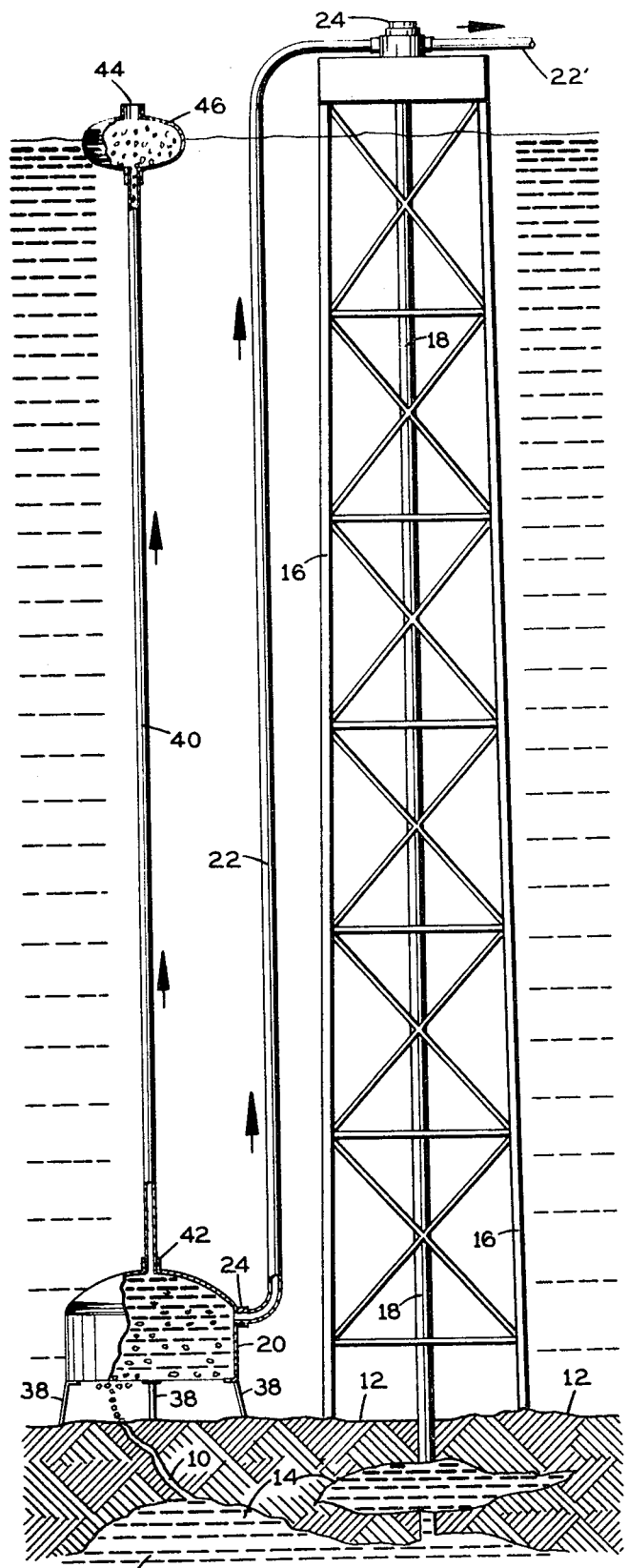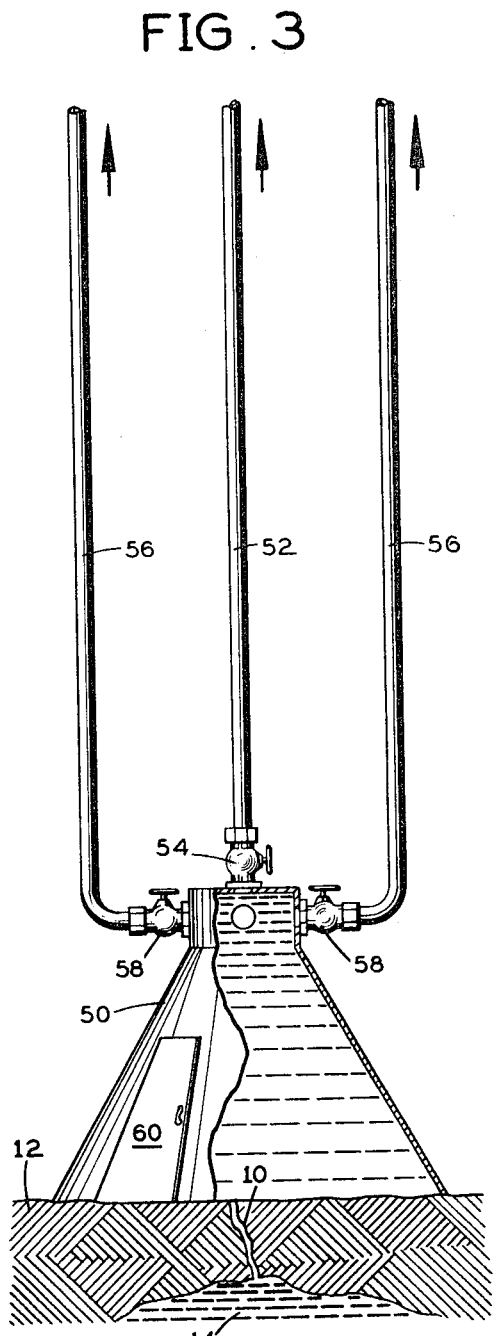
FIG. 2
FIG. 3
INVENTOR.
THADDEUS A. MADEJ
BY John H. Oltman

METHOD AND APPARATUS FOR COLLECTING OIL FROM AN UNDERWATER LEAK

BACKGROUND OF THE INVENTION

Recently, there have been oil leaks from holes in the ocean floor which have caused great damage to property and also to wildlife. Efforts to stop such oil leaks by pumping drilling mud into the source of the leak have not been entirely successful; for one reason, because this process is relatively slow and considerable contamination may occur before the leak is stopped. A method of collecting oil from an underwater leak until the leak can be plugged or otherwise stopped would be desirable.

Accordingly, it is an object of the present invention to provide a method of and apparatus for collecting oil from an underwater leak which can be carried out relatively rapidly to minimize contamination from leaking oil.

Another object of the invention is to provide a method of and apparatus for collecting oil from an underwater leak which can be applied to leakage from a fault or fissure as well as to leakage from vertical well piping.

A further object of the invention is to provide a method of collecting oil from an underwater leak which can be carried out relatively economically and without unusual danger to operating and repair personnel.

A further object of the invention is to provide a method of collecting oil from an underwater leak by means of submerging a collector shell to a position where it covers and partially encircles or encloses the source of the leak, and causing oil to flow from the collector shell to a storage means.

Other objects of this invention will appear in the following description and appended claims, reference being had to the accompanying drawings forming a part of this specification wherein like reference characters designate corresponding parts in the several views.

ON THE DRAWINGS

FIG. 2 is a view similar to FIG. 1 showing another form of collector shell provided with a vent for venting gas to the surface of the water; and FIG. 3 is an enlarged view, partially broken away, of a collector shell which is a modification of the collector shell shown in FIG. 1.

Figure 1:
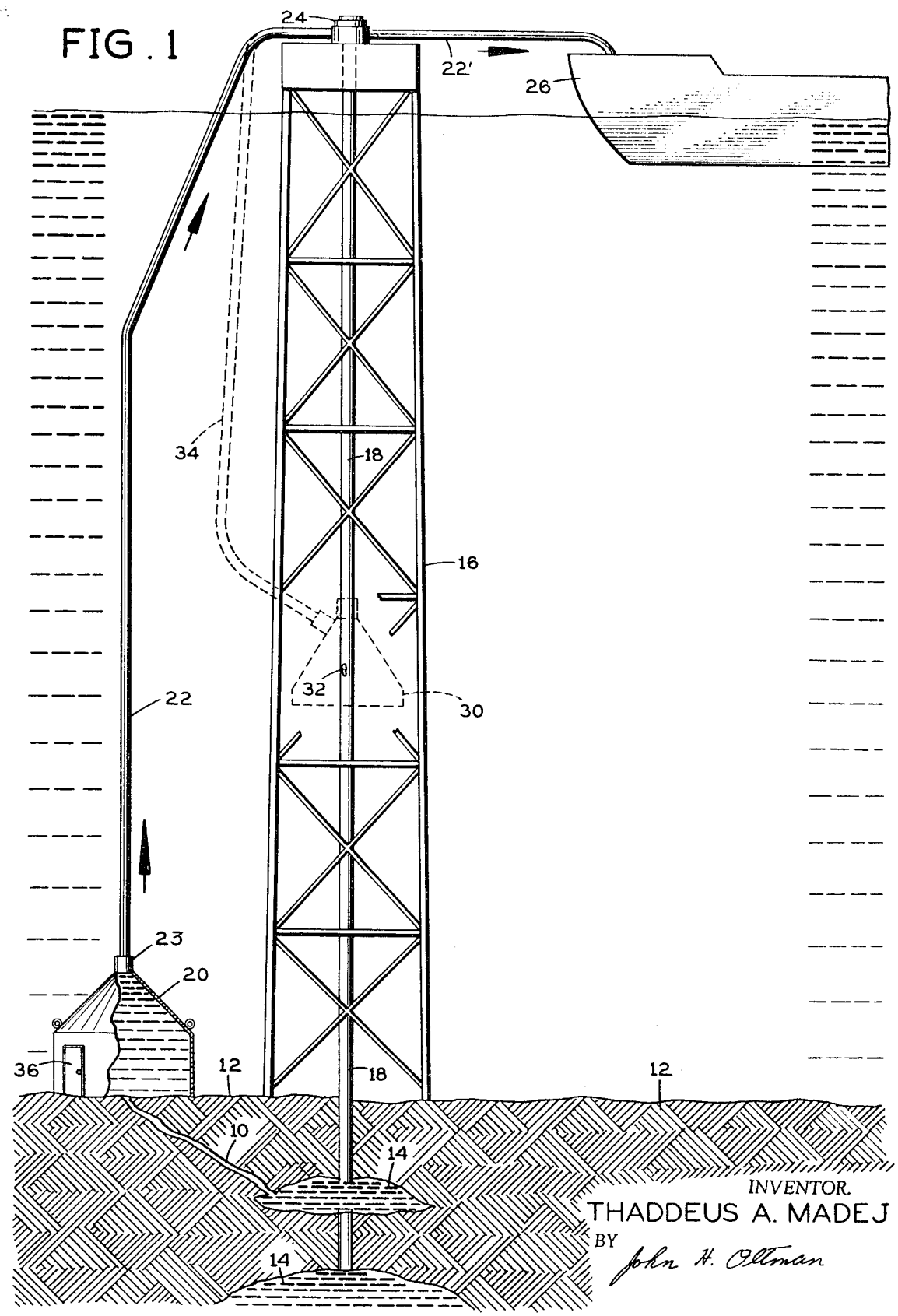
FIG. 1 shows a collector shell submerged under water and, together with the bottom, substantially fully enclosing a fault from which oil leaks into the collector shell and from which oil is pumped to a storage receptacle which in this embodiment is in a ship, this view also showing in dashed lines a collector shell positioned over a leak in a drilling pipe.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

In FIG. 1, an oil leak from a fault 10 is shown, the fault extending to the ocean bottom 12 from an underground oil pocket 14 below the ocean in an off shore location. The pocket 14 is under an oil well tower 16 which has a well pipe 18. The first step of the method of the invention is to locate the fault 10 or other source of an oil leak, and this is done by conventional techniques.

A collector shell 20 which is shaped something like an inverted funnel is then submerged from the surface of the ocean or other body of water to a position where it covers and encloses the upper end of the fault 10 as shown in FIG. 1. Preferably the open bottom of the collector shell 20 is located on or just above the ocean floor 12 directly over the mouth of the fault 10. The collector shell 20 may be lowered by means of suitable rigging from a ship or boat and may be guided into position over the mouth of the fault 10 by divers or television camera.

When the collector shell is in the proper position over the fault 10, a conduit 22 is connected to an open top 23 of the collector shell 20. The conduit 22 extends from the collector shell to the surface of the body of water, and in this embodiment the upper end of the conduit 22 is connected to a pump 24 which is mounted on the tower 16 above the surface of the water. From the pump 24, an extension 22' of the conduit 22 leads to a storage receptacle which may be provided in a ship 26 as shown in FIG. 1. If desired, however, a storage receptacle could be provided in a fixed location, and if the well is not too far from shore, the storage receptacle could be located on shore.

After the collector shell 20 is in place, oil rises from the fault 10 directly into the collector shell and displaces some water from the collector shell to partially fill the shell. Oil or a mixture of oil and water is then pumped from the collector shell through the conduit 22 to the storage receptacle 26 by means of the pump 24. The pumping of oil from the collector shell 20 is continued at a rate sufficient to draw off all oil leaking from the fault 10. While this collecting of oil is continuing, the well may be plugged as by pumping drilling mud into it by conventional techniques, the collection of oil by means of the collector shell 20 and pump 24 serving to prevent contamination of the water until such time as the well can be plugged in a manner to block the path or flow of oil to the fault 10.

FIG. 1 also shows in dashed lines how a collector shell 30 may be positioned around a leak through a hole 32 in the well piping 18. The collector shell 30 is again funnel-shaped, and it may be provided in two halves which may be joined around the piping 18 to position the collector shell 30 directly over and partially enclosing the hole 32. A conduit 34 extends from the collector shell 30 to the pump 24 in accordance with the previous description and it will be assumed that the same conduit 22' leads from the pump 24 to the storage receptacle in the ship 26. Just as in the case where oil is leaking from a source below the floor 12 of the ocean, the first step where there is a leak in the piping 18 is to locate the leak. Next the halves of the funnel or collector shell 30 are submerged and assembled in a position where the collector shell 30 partially encloses the opening 32. Oil rises from the opening 32 into the collector shell and displaces some water from the shell. Oil is pumped from the shell through the conduit 34 to the storage receptacle in the ship 26 by means of the pump 24. This collection of oil is continued until such time as the leak is stopped.

In the case of the shell 30, access may be had to the hole 32 from underneath the collector shell. In the case of the collector shell 20, access may be had to the fault 10 through a door 36 provided in the side of the collector shell 20 as shown.

FIG. 2 shows how the method of the invention may be carried out with slightly different apparatus than that shown in FIG. 1. Since these two views are very similar, the same reference numerals are used for like parts. One of the differences is that the collector shell 20 in FIG. 2 has legs 38 which support the bottom of the shell somewhat above the floor 12 of the ocean. As in the embodiment described previously, the collector shell 20 is submerged to a position directly over and enclosing the mouth of the fault 10. Oil rises from the fault 10 directly into the collector shell 20 and collects in the shell 20. A conduit 22 is connected to the shell 20 and to a pump 24 provided on the tower 16. The conduit extension 22' leads from the pump 24 to a storage receptacle such as the ship 26 of FIG. 1. A second conduit 40 leads from an opening 42 at the top of the shell 20 of FIG. 2 to a vent opening 44 above the surface of the water. The conduit 40 is connected to the shell 20 after it has been submerged. The conduit may be supported by a floating shell 46 as shown. The purpose of the vent conduit 40 is to allow gas to escape from the oil collected in the shell 20.

FIG. 3 shows a modified collector shell 50 which is similar to the shell 20 of FIG. 1 in that it has a funnel-like shape. An opening is provided at the top of the shell 50, and a conduit 52 is connected to this opening through a valve 54. Other openings are provided at the sides of the shell 50 near the top thereof, and conduits 56 are connected to these openings through valves 58. The door 60 is provided in the side of the shell, if desired.

The purpose of the conduit 52 is to allow gas to escape to a vent opening such as the opening 44 in FIG. 2. Oil can be pumped through other conduits 56, and by providing a plurality of conduits 56, more than one pump can be used if needed. It will be apparent that the other shells could likewise be provided with multiple conduits. It may be seen that the shell 50 rests on the floor 12 of the ocean or other body of water directly above and partially enclosing the mouth of the fault 10 from which oil leaks.

The invention provides a method for collecting oil from an underwater leak which can be carried out relatively rapidly to minimize contamination of the water until the leak can be stopped. The apparatus employed in carrying out the method is relatively simple and not unduly expensive. The method does not involve serious danger to operating and repair personnel. The method allows for escape of gas if gas is present.

Having thus described my invention, I claim:

1. Apparatus for collecting oil from a leak in the natural floor of a body of water under the surface of the body of water comprising, an inverted, hollow, heavy or weighted collector shell in the form of an inverted funnel means completely submerged under the surface of the water and positioned in close proximity to the source of the leak directly over and enclosing the leak, a vent conduit leading from the uppermost top of said shell to the surface of the water for venting gases, means for stabilizing the upper end of said vent conduit, a positive pump at the surface of the water having a suction side and a discharge side, and a conduit leading out from a portion of said collector shell below the outlet for said vent conduit and above the bottom of the shell for raising oil and for separating gas from the oil under water, the latter conduit leading to said suction side and through said pump and out said discharge side to a storage receptacle, said pump serving in operation to suck oil from said collector shell and supply the oil to said receptacle, and said vent structure serving to separate gas from the oil under the water and vent the same separately from the oil.

2. A method of collecting oil from a leak in a natural floor of a body of water under the surface of the body of water, comprising the steps of:
    a. locating the leak,
    b. completely submerging a heavy or weighted inverted collector shell under the surface of the water to a position in close proximity to the source of the leak and directly over and enclosing the leak to allow oil to rise, because of its lower density, from the leak into the collector shell,
    c. providing a first conduit leading from the side of the shell to the suction side of a positive pump at the surface of the water and out the discharge side of the pump to a storage receptacle, and a second venting conduit from the top of said shell leading to the water surface for venting gases, and
    d. pumping oil from the shell through said conduit to said storage receptacle by suction with said pump, while
    e. separating gas in the shell below the water and venting the gas through said second conduit.

* * * * *